United States Patent Office 3,522,506
Patented Aug. 4, 1970

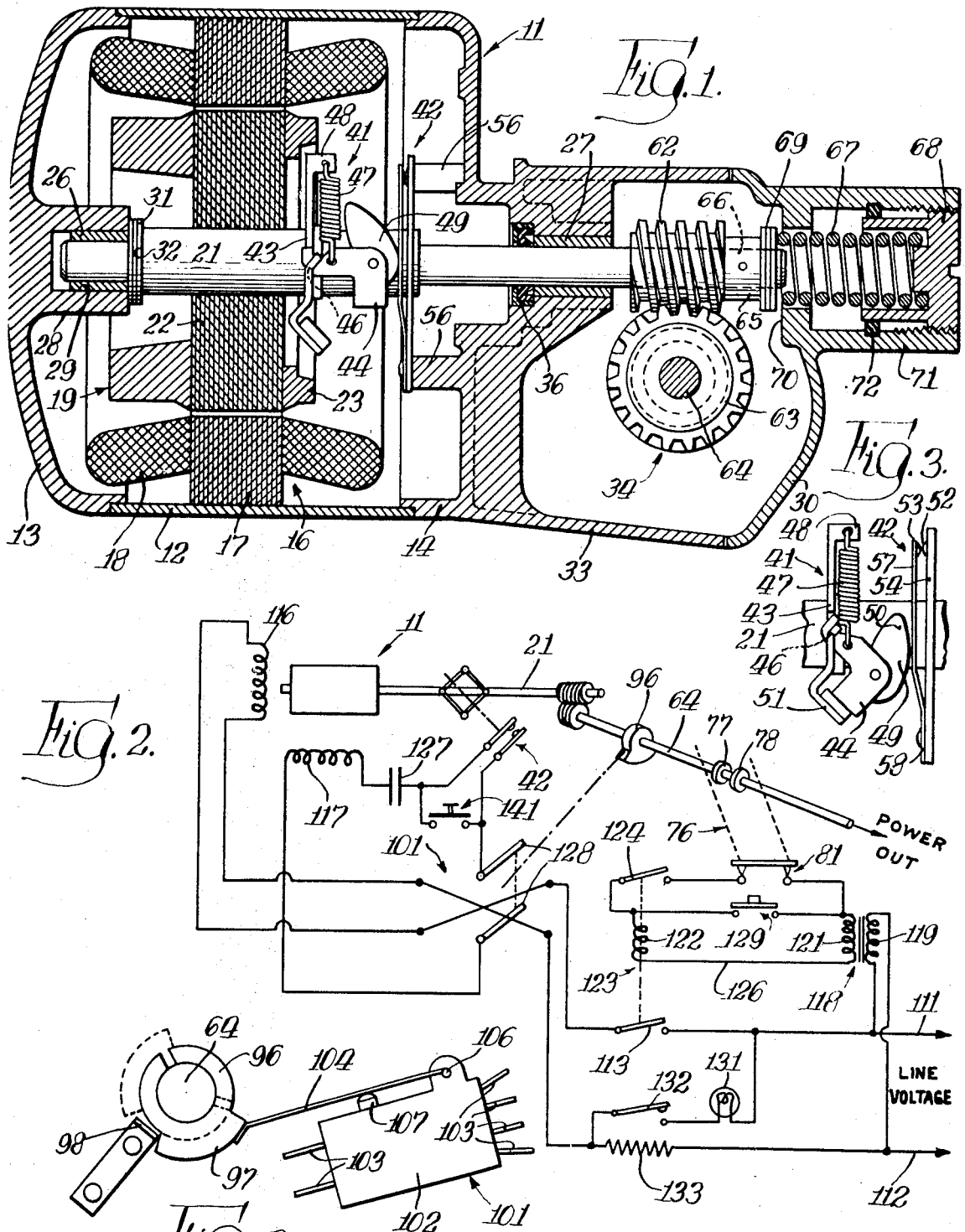

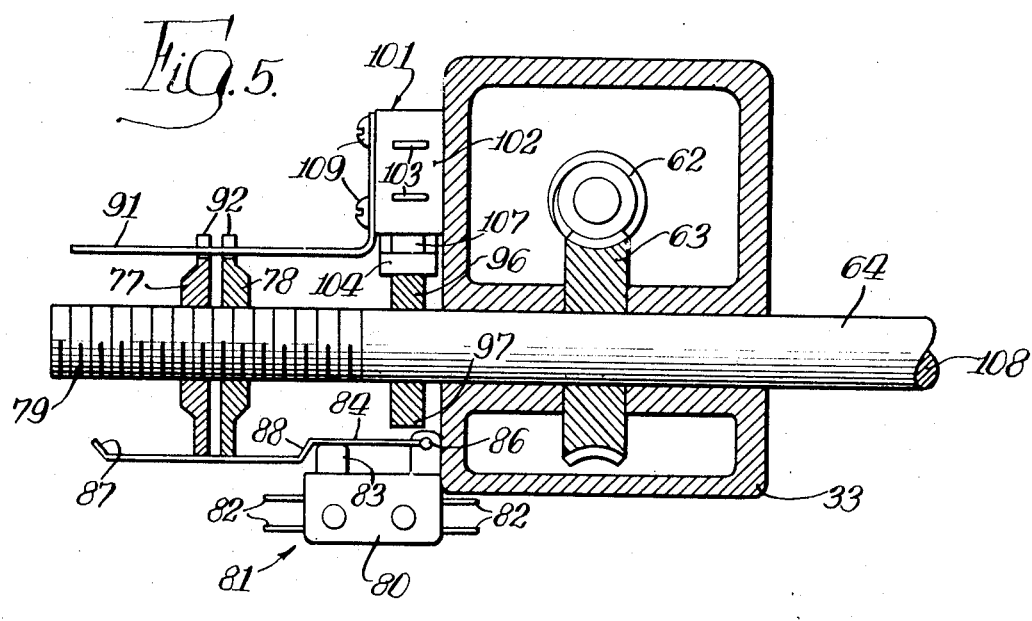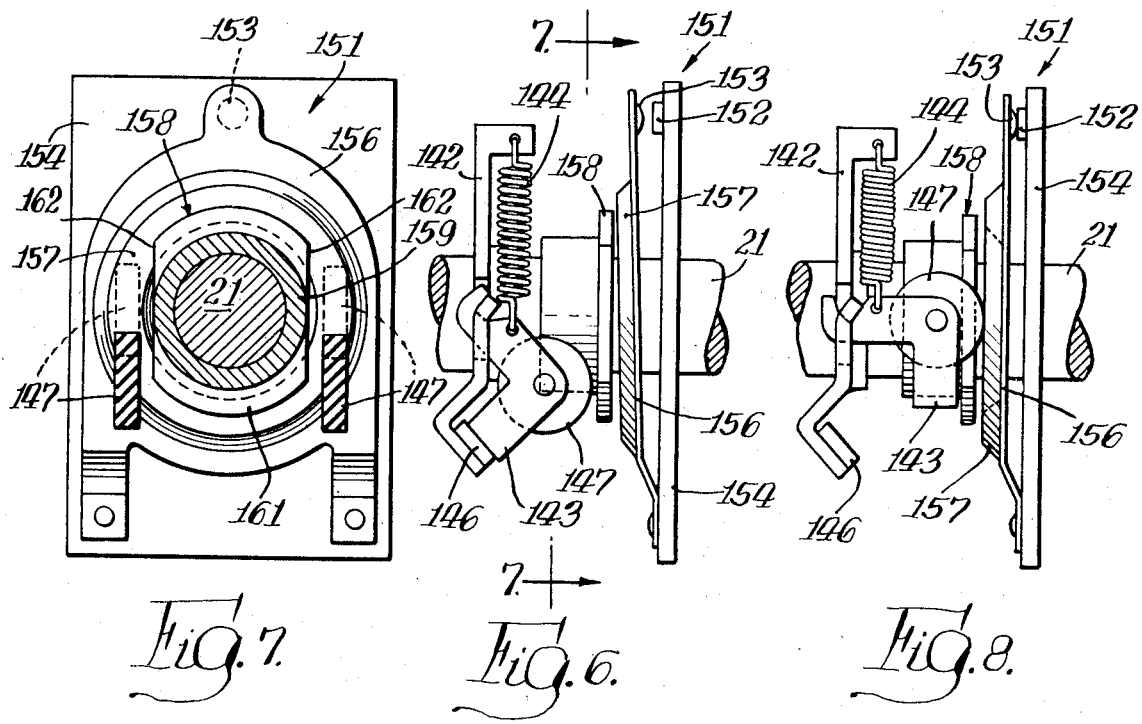

3,522,506
REVERSIBLE ELECTRIC MOTOR DRIVE
Edward J. Schaefer, Bluffton, Ind., assignor to Franklin Electric Co., Inc., Bluffton, Ind., a corporation of Indiana
Filed Mar. 29, 1967, Ser. No. 626,766
Int. Cl. H02h 7/085
U.S. Cl. 318—475
13 Claims

ABSTRACT OF THE DISCLOSURE

This disclosure deals with a reversible electric motor drive for a mechanism such as a garage door, the motor including running and starting windings and a centrifugal switch for controlling energization of the starting winding. The drive further includes limit switches which automatically deenergize the running winding when the mechanism reaches its limit of travel in either direction, and direction sensing means for reversing the connections to the starting winding after the mechanism has been driven in either direction for a relatively short distance. The motor further includes obstruction sensing means which automatically and instantly reverses the motor in the event the drive encounters an obstacle, such instant reversal being accomplished by closing the centrifugal switch to energize the starting in the reverse direction.

---

Reversible electric motor drives have been provided to operate a mechanism such as a garage door. An example of such a drive is described in E. J. Schaefer Pat. No. 3,078,407, which discloses an instantly reversible electric motor, direction sensing means for setting the motor to run in alternately one and then the other direction, and obstacle sensing means to instantly reverse the direction of rotation of the motor in the event the drive meets an obstacle. While the drive shown in the above patent operates very well, the present drive is an improvement thereon, in that similar operation is obtained with fewer parts and a less expensive type of motor may be used.

In summary, a system embodying the invention comprises a reversible electric motor including a starting winding and a running winding, and cut-out means connected to the starting winding for deenergizing the starting winding when the motor is approximately at its running speed. The system further includes two position reversing means for connecting the starting winding to a power supply for motor operation alternately in one direction and then the other direction. The system further includes means for sensing the direction of rotation of the motor and actuating the reversing means from one of its two positions to the other of its two positions. The construction of the sensing means is such that, as the motor starts up in one direction, after a predetermined time delay the reversing means is actuated by the rotation sensing means to precondition the motor for subsequent rotation in the opposite direction, said time delay being sufficiently long that the cut-out means has previously deenergized the starting winding. Thus, shortly after the motor starts to turn in one direction, it is preset for later operation in the opposite direction.

The system further includes a safety mechanism which causes the motor immediately to stop turning in one direction and then to turn in the opposite direction in the event the device being driven by the motor meets an obstacle while being driven by the motor when turning in said one direction. The safety mechanism accomplishes this simply by actuating the cut-out means to reenergize the starting winding this being possible because of the previously described presetting of the reversing means. The presetting of the reversing means also makes it possible to instantly reverse the drive at any time simply by short circuiting the cut-out means.

The objects and advantages of the invention will become apparent from the following detailed description taken in conjunction with the accompanying figures of the drawings, in which:

FIG. 1 is a sectional view of a drive mechanism embodying the invention;

FIG. 2 is a schematic electrical diagram of a control circuit for the drive mechanism shown in FIG. 1;

FIG. 3 is a fragmentary view of a portion of the mechanism shown in FIG. 1;

FIG. 4 is a fragmentary view showing another portion of the mechanism in FIG. 1;

FIG. 5 is a fragmentary sectional view taken on the line 5—5 of FIG. 1;

FIG. 6 is a view similar to FIG. 3 but showing an alternative form of the portion of the mechanism shown in FIG. 3;

FIG. 7 is a sectional view taken on the line 7—7 of FIG. 6; and

FIG. 8 is a view similar to FIG. 6 but showing another position of the mechanism.

The drive mechanism shown in FIG. 1 comprises a single phase induction motor 11 including a cylindrical outer shell 12 and two transversely extending end bells 13 and 14. The motor 11 further includes a stator 16 secured to the inner periphery of the shell 12, the stator 16 including laminations 17 and stator windings 18. A rotor 19 is further provided, comprising a rotor shaft 21, rotor laminations 22, and rotor windings 23 which may be of the conventional squirrel cage type.

The rotor shaft is journaled for rotation on the two end bells 13 and 14 by bearings 26 and 27, respectively. A generally cylindrical, axially inwardly extending boss 28 is formed on the inner surface of the end bell 13, and a bore 29 formed in the boss 28 receives the bearing 26. Thrust washers 31 are preferably positioned between the end surface of the boss 28 and a shoulder 32 formed on the rotor shaft 21, to carry endwise thrust toward the left as seen in FIG. 1.

The other bearing 27 is supported by the end bell 11 which together with a cap 30 form a housing 33 for a speed reduction gear assembly 34 to be described hereinafter. The two bearings 26 and 27 are in axial alignment as shown in FIG. 1, and the shaft 21 extends through the bearing 27 to the assembly 34. Since the interior of the housing 33 is normally filled with a lubricant, an oil seal 36 is preferably provided around the shaft 21, the seal 36 being located between the rotor 19 and the bearing 27.

As will be described hereinafter, the stator windings 18 include a starting winding and a running winding, and to disconnect or cut out the starting winding when the motor substantially reaches running speed, a centrifugal mechanism 41 and a switch 42 are provided. The centrifugal mechanism 41 is generally of the type shown in E. J. Schaefer Pat. No. 2,516,922, and comprises a support bracket 43 having an opening formed therein through which the rotor shaft 21 extends. The support bracket 43 is secured to the shaft 21 in a conventional manner such as by a press fit. The centrifugal mechanism 41 further comprises an actuating member 44 which extends on opposite sides of the rotor shaft 21 and is pivotally connected at 46 to the support bracket 43. A pair of tension springs 47, one on each side of the shaft 21, are pivotally connected between the actuating member 44 and a pair of lugs 48 formed on the support bracket 43, the springs 47 tending to pivot the actuating member 44 in the counterclockwise direction as seen in FIGS. 1 and 3. When the shaft 21 is stationary, the actuating member 44 is in the at-rest position shown in FIG. 1 due to the tension of the two springs 47. The actuating member 44 carries a pair of egg-shaped switch operating discs 49 made of insulating material, which are secured to the member 44 and engage and hold the switch 42 closed, as shown in FIG. 1, at standstill and at low motor speeds. However, when the rotor shaft 21 rotates at running speed, the off center weight of the actuating member 44 causes the actuating member 44 and the discs 49 to swing in the clockwise direction about the pivots 46 due to centrifugal force, the actuating member 44 swinging to the running position shown in FIG. 3 where it engages stops 51 formed on the support bracket 43. When the actuating member 44 and the discs 49 are in the position shown in FIG. 3, the discs 49 are out of engagement with the switch 42, thereby permitting the switch contacts to open.

The switch 42 (FIGS. 1 and 3) comprises a stationary contact 52 and a movable contact 53. The stationary contact 52 is mounted on a sheet 54 of insulating material which in turn is rigidly secured to a plurality of bosses 56 formed on the end bell 14. The movable contact 53 is secured to the free end of a flexible leaf spring 57 which has its other end secured to the insulating sheet 54 as at 58. The spring 57 is a plate-like member and has an opening formed therethrough which reecives the shaft 21. When the shaft 21 is stationary or is turning slowly the actuating member 44 and the discs 49 are in the at-rest position shown in FIG. 1, the discs 49 engage the spring 57 and hold the movable contact 53 in engagement with the stationary contact 52. However, when the actuating member 44 and the discs 49 are in the running position shown in FIG. 3, the discs 49 are out of engagement with the spring 57 and the spring action of the spring 57 holds the contact 53 out of engagement with the stationary contact 52. The contacts 52 and 53 are connected in the control circuit shown in FIG. 2 by suitable conductors (not shown in FIGS. 1 and 3).

As previously mentioned, the speed reduction gear assembly is located in the housing and comprises a worm 62 secured to an extension 66 of the rotor shaft 21 and a worm gear 63 which meshes with the worm 62 and is rigidly secured to a power output shaft 64. The shaft 64 is suitably journalled in the housing 33 for rotation on an axis which is normal to the axis of the rotor shaft 21.

Since a worm 62 and worm gear 63 is shown in the present instance, the load on the worm gear 63 will tend to move the shaft 21 in opposite directions depending on the direction of rotation. For this reason the extension 66 of the rotor shaft 21 within the housing 33 is urged toward the left, as seen in FIG. 1 by a compression spring 67 which is positioned in a boss 71 on the housing 33 and bears against a threaded plug 68 in the boss 71, and a plurality of thrust washers 69 which are mounted on the extension 66 of the rotor shaft 21 and which abut a collar 65 secured to the extension 66. The amount of force urging the rotor shaft 21 toward the left due to the force of the spring 67 may be adjusted by turning the plug 68 either in or out. To prevent the lubricant from leaking from the housing 33 and to prevent dirt and moisture from entering the interior of the housing 33 through the boss 71, an O-ring seal 72 is preferably provided between the outer periphery of the plug 68 and the inner periphery of the boss 71.

As will be described more fully hereinafter the drive includes a safety feature which causes the motor to instantly stop and reverse its direction of rotation in the event the device being driven encounters an obstruction. When the device being driven is moving in a first direction, the reaction forces on the rotor shaft 21 acting through the gear 63 and the worm 62 tend to move the motor shaft 21 toward the right as seen in FIG. 1, and when the device is being driven in the opposite direction, the reaction forces tend to move the rotor shaft 21 toward the left. The boss 28 and the thrust washers 31 prevent leftward movement of the shaft 21, but the spring 67, being yieldable, permits limited rightward movement of the shaft. During assembly of the drive, the plug 68 is threaded into the boss 71 sufficiently far to preload the compression spring 67, and the amount of the preload is adjusted to a predetermined value. When the reaction through the gear 63 and worm 62 on the shaft 21 is greater than the preload on the spring, the spring 67 yields and permits the shaft 21 to shift toward the right. Since the motor 11 is normally operating at running speed when the predetermined value is exceeded, centrifugal mechanism 41 is in the running position shown in FIG. 3 and the switch 42 is open. However, when the rotor shaft 21 shifts toward the right, the elongated end portions 50 of the egg-shaped discs 49 move into engagement with the leaf spring 57 of the switch 42 and close the switch contacts 52 and 53 even though the motor is still substantially at running speed. As will be explained hereinafter, closure of the switch 42 results in immediate stopping and reversal of the motor. To prevent excessive shift of the shaft 21, which might damage the centrifugal mechanism 41 and the switch 42, a transverse flange 70 is formed in the housing portion 33, around the spring 67 and a short distance to the right of the thrust washer 69. Thus, if the shaft 21, shifts to the right, the washers 69 will engage the flange 70 and prevent excessive shift of the shaft 21.

In the event the drive is connected to a device, such as a garage door, which is movable between set limits, a limit switch mechanism should be provided to deenergize the drive when the device reaches either of the limits. While such a limit switch mechanism may be of conventional form, in the present instance a limit switch mechanism 76 (FIGS. 2 and 5) is provided, comprising a threaded portion 79 of the power output shaft 64 and two internally threaded limit switch nuts 77 and 78 which are threaded onto the portion 79. A disengageable stop 91 is also provided which is positioned in notches 92 formed in portions 89 of the nuts 77 and 78. The stop 91 slidably engage the portions 89 to prevent rotative movement of the nuts but also permit axial movement of the nuts along the shaft. The stop 91 may be manually moved upwardly out of engagement with the nuts to permit axial adjustment of the nuts.

The limit switch mechanism 76 further comprises an electrical switch 81 including a housing 80 having contacts 82 thereon for connecting the switch into the electrical control circuit, and an actuating button 83. The switch contacts (not shown in FIG. 5) within the housing 80 are normally closed, and whenever the button 83 is pressed inwardly, the switch contacts are opened. The switch 81 further comprises an actuating leaf 84 which has one end pivotally connected to the housing 80 as at 86. The actuating leaf 84 extends adjacent the outer end of the button 83 and adjacent the two nuts 77 and 78. The portion of the leaf 84 adjacent the nuts 77 and 78 is bowed outwardly away from the nuts 77 and 78, the ends of the bow forming two cam portions 87 and 88. When one of the nuts 77 or 78 engages the adjacent cam portion 87 or 88, the leaf 84 is pivoted counterclockwise about the point 86 and presses the button 83 downwardly to open the switch contacts.

Assuming that the motor 11 is energized and the two nuts 77 and 78 are located between the cam portions 87 and 88, rotation of the shaft 64 in one direction will cause the two nuts 77 and 78 to travel toward the left axially along the shaft 64 until the nut 77 engages the cam portion 87 and opens the switch. When the shaft 64 is rotated in the opposite direction, the nuts 77 nad 78 travel along the shaft 64 toward the right until the nut 78 engages the cam portion 88 and again opens the switch. When the stop member 91 is moved out of engagement with the two nuts 77 and 78, the relative positions of the two nuts 77 and 78 on the shaft 64 may be adjusted by turning one or both of the nuts. Such adjustment determines the positions of the device being driven, at which the switch contacts will be opened.

As will be explained hereinafter, the drive is energized for rotation alternately in one and then the other direction each time the motor is energized. To this end, a cam 96 (FIGS. 2, 4 and 5) is fastened by a friction fit to the power output shaft 64 in order to preset the control circuit for such reversal of operation. The friction fit causes the cam 96 to turn with the shaft 64 until a raised portion 97 of the cam engages a stop 98 located adjacent the cam. After the portion 97 engages the stop, the shaft 64 continues to rotate but the cam 96 slides on the shaft and remains stationary until the shaft is rotated in the oppostie direction. The cam 96 is connected to actuate a doublepole double-throw snap action reversing switch 101 including a case 102 having a plurality of electrical contacts 103 extending therefrom. An arm 104 is pivotally connected to the case 102 as at 106, and the arm 104 extends adjacent a button 107 which when raised places the switch 101 in one position and when depressed places the switch 101 in the opposite position. The free end of the arm 104 extends adjacent the cam 96 and is engageable by the raised portion 97 to depress the button 107. It will be apparent from FIG. 4 that, when the shaft 64 is rotated in the clockwise direction, the cam 96 will turn with the shaft 64 until one side of the raised portion 97 engages the stop 98, the raised portion 97 also engaging the free end of the arm 104 and pressing the button 107 down. This position is shown in full lines in FIG. 4. When the shaft 64 is subsequently rotated in the counterclockwise direction, the cam 96 rotates with it due to the friction connection, until the opposite side of the raised portion 97 engages the stop 98. In this position of the cam 96 (shown in dashed lines in FIG. 4), the portion 97 is out of engagement with the leaf 104 and the button 107 is in the raised or released position.

As shown in FIG. 5, the shaft 64 extends out of the housing portion 33 in both directions, one end portion 108 being adapted to be connected to a load and the other end portion containing the threads 79. The switch 101 and the stop 91 are secured to the outside of the housing portion 33 by screws 109, and the other switch 80 is secured to the housing portion by suitable means (not shown). The limit switch nuts 77 and 78 are located adjacent the end of the shaft 64, and the cam member 96 is located between the nuts and the housing portion 33.

The electrical control circuit of the drive is shown in FIG. 2. The control circuit comprises two power input lines or conductors 111 and 112 which are connectable to a suitable single phase A.C. power supply. The power input conductors 111 and 112 are connected through a normally open on-off switch 113 and the double-pole double-throw switch 101 to energize a running winding 116 and a starting winding 117 of the motor 11, the windings 116 and 117 forming the stator windings 18 in FIG. 1.

While the motor may comprise either a split-phase or a capacitor start motor, a capacitor motor is described herein. The running winding 116 of the motor 11 is connected through the switch 101 to the conductors 111 and 112 such that it is always energized in the same direction. The starting winding 117 is connected to be energized through a series circuit including a starting capacitor 127, the centrifugally actuated switch 42 and the movable contacts 128 of the double-pole double-throw switch 101. It will be apparent from FIG. 2 that, when the movable contacts 128 are moved to the right hand set of contacts, current will flow in one direction through the starting winding 117 and energize the motor 11 for rotation in one direction, and when the movable contacts 128 are moved to the left hand set of contacts, current will flow in the opposite direction through the starting winding 117 and cause rotation of the motor 11 in the opposite direction because of the crossed connections between the right and left hand sets of contacts.

The control portion of the circuit is of the low voltage type, and comprises a step-down transformer 118 having its primary winding 119 connected across the power input conductors 111 and 112 and its secondary winding 121 connected across the coil 122 of a relay 123. The relay 123 includes the on-off switch contacts 113 previously referred to and a normally open switch 124. One side of the secondary winding 121 is connected directly to one side of the coil 122 by a conductor 126, while the other side of the secondary winding 121 is connected to the other side of the coil 122 by two paths, one of the paths including a normally open start switch 129 and the other of the two paths including the normally open relay switch 124 and the normally closed contacts of the limit switch 81.

As previously described, the double-pole double-throw snap action switch 101 is arranged to be actuated by the cam 96. When the button 107 is pressed down by the leaf 104, the movable contacts 128 engage one of the sets of stationary contacts, and when the button 107 is up, the movable contacts 128 engage the other set of stationary contacts.

It will be noted from FIG. 4 that the raised portion 97 of the cam 96 extends through an arc of approximately 90°. Therefore, the shaft 64 and the cam 96 will turn through an angle of approximately 270° from the time one side of the raised portion 97 moves out of engagement with the stop 98 until the other side of the raised portion 97 moves into engagement with the stop. When the motor starts up and the cam 96 rotates in a counterclockwise direction from the position shown in FIG. 4, the shaft 64 must rotate through an angle of approximately 90° before the connections in the switch 101 will be reversed. When the cam 96 is rotated in the clockwise direction the shaft 64 must again rotate through an angle of approximately 90° before the leaf 104 will be engaged by the raised portion 97. Thus, there is a built-in time delay from the time the motor is initially started and the time when the reversing switch 101 is actuated to reverse its connections, and this time delay is arranged to be at least as long as the length of time required for the switch 42 to be opened by the centrifugal mechanism 41.

The system preferably also includes a light 131 connected across the power input connectors 111 and 112 in series with a thermally responsive normally open switch 132. A heat generating resistance element 133 is connected in series in the power line 112 and is located physically adjacent the switch 132. When the motor is first energized, current flows through the power input conductor 112 and the heat generating resistance element 133, such heat causing the switch 132 to close and energize the light 131. Later, when the system is deenergized as will be explained hereinafter, a predetermined period of time must elapse before the element 133 and the switch 132 cool sufficiently to permit the switch to open again and deenergize the light 131. Thus, the light 131 will remain on for a predetermined length of time after the motor has been deenergized, such predetermined length of time being sufficient for an operator to turn on other lights if he desires. The amount of current flowing through the light 131 when it is energized is not sufficient to generate enough heat in the element 133 to maintain the switch 132 in the closed position after the motor is deenergized.

Assume that the drive shaft 64 is connected to raise and lower a garage door and the light 131 is located within the garage. If the door is initially closed and the motor is deenergized, the limit switch nut 77 will be in engagement with the cam portion 87 and the limit switch 81 will be open. Further, the movable contacts 128 of the reversing switch 101 will be in the right hand position, and the switches 81, 113, 124, 129 and 132 will all be open. However, the switch 42 will be closed. Thus, no current will flow through the motor because of the open switch 113 and no current will flow through the light 131 because of the open switch 132, but current may flow through the primary winding 119 of the transformer 118.

To energize the system to raise the door, the start switch 129 is momentarily closed, thereby causing current to flow through the secondary winding 121 and the relay coil 122, causing the switches 113 and 124 to close. Since the switch 42 is initially closed, current will flow through both the running and starting windings and the motor 11 will start up and raise the door to the open position. With initial turning movement of the output shaft 64, the limit switch nut 77 moves away from the cam portion 87 and the limit switch 81 closes. Thereafter, the manually operable start button 129 may be released and the relay coil 122 will continue to be energized through the switch 124 and the limit switch 81. Thus, the circuit including the switches 124 and 81 forms a holding circuit. The motor 11 reaches running speed in a very short time, and when the motor is at running speed the centrifugal mechanism 41 shifts to the running position shown in FIG. 3 and the switch 42 opens, thereby deenergizing the starting winding 117. Rotation of the power output shaft 64 in the counterclockwise direction also causes the cam 96 to turn, and after approximately ¼ revolution of the shaft 64 the reversing switch 101 is actuated to move the contacts 128 to the left hand position, thus presetting the starting winding 117 for subsequent energization in the opposite direction of rotation. Due to the previously mentioned time delay, the switch 42 is open at the time of actuation of the reversing switch 101, and therefore actuation of the switch 101 has no immediate effect on the motor operation. In addition to the foregoing, current flowing through the power line 112 and the element 133 causes the switch 132 to be heated and closed, and the light 131 to be energized. As the garage door reaches its raised position, the limit switch nut 78 moves into engagement with the cam portion 88 and the leaf 84 presses the button 83 and opens the limit switch 81. Since the switch 129 was previously opened, opening of the limit switch 81 deenergizes the relay coil 122, resulting in opening of the switch 113 and deenergization of the motor with the door in the fully raised position. As previously explained, deenergization of the motor does not immediately also result in deenergization of the light 131 because the switch 132 must cool before the light 131 will turn off.

To subsequently lower the garage door, the start button 129 is again manully closed and the foregoing series of events is repeated. However, due to the previous actuation of the reversing switch 101, the start winding 117 will be connected for energization of the motor in the opposite direction of rotation, resulting in rotation of the power output shaft 64 in the opposite direction and lowering of the garage door. In the event that nothing unusual occurs, the limit switch nuts 77 and 78 move toward the left as the garage door closes and as soon as the nut 77 engages the cam portion 87, the limit switch 81 is again opened and the power circuit is deenergized. Previously, however, the cam 96 had turned to preset the connections to the start winding 117 for rotation of the motor in the opposite direction for subsequent raising of the garage doors.

If, during the downward travel of the garage door, the door meets an obstacle, the reaction forces acting through the gear 63 and the worm 62 causes the shaft 21 to shift toward the right against the force of the spring 67. The discs 49 of the centrifugal mechanism 41, which is secured to the shaft 21, also shift toward the right and close the switch 42. Since the connections through the reversing switch 101 to the start winding 117 were previously set for motor energization in the opposite direction, closure of the switch 42 immediately results in reenergization of the start winding 117 for rotation of the motor 11 in the opposite direction. The motor 11 immediately comes to a halt and starts up again in the opposite direction to raise the garage door away from the obstacle. When the motor starts in the opposite direction, the load returns to normal and the shaft 21 returns to its normal position. The start winding 117 is again deenergized by the centrifugal mechanism 41 when the motor reaches running speed. After the door reaches the fully open position, the nut 77 again engages the cam 87 and opens the limit switch 81 to deenergize the motor. The motor then remains deenergized until the start button 127 is again actuated.

While the switch 129 has been described as being a manually operated push button switch, it could also be automatically operated from a remote location. In the case of a garage door, for example, conventional means could be provided to automatically close the switch 129 in response to a radio, sound or light signal, for example.

In some applications of the drive, it may be desirable to be able to instantly reverse the direction of rotation of the motor at any time. This may easily be accomplished with the present drive by providing a normally open manually operated switch 141 (FIG. 2) connected in parallel with the switch 42. If the motor is operating at running speed in either direction, closing of the switch 141 will complete the circuit through the starting winding 117, and since the reversing switch 101 had previously preset the connections to the starting winding for motor rotation in the opposite direction, the motor will immediately come to a stop and then start up again in the opposite direction. If the switch 141 is closed, it may be released as soon as the motor has slowed sufficiently to permit the centrifugally actuated switch 42 to close.

In FIGS. 6 to 8 is shown an alternate form of centrifugal mechanism which may be used in the drive. The mechanism comprises a support bracket 142 adapted to be secured to the shaft 21, an actuating member 143, tension springs 144, and a stop 146, the elements being similar to the corresponding elements of the centrifugal mechanism shown in FIGS. 1 and 3. A pair of laterally spaced switch actuating discs 147 are again secured to the member 143, but the discs 147 are circular rather than egg-shaped as in the previous embodiment.

A switch 151 generally similar to the switch 42 is also provided, comprising stationary and movable contacts 152 and 153, the stationary contact 152 being secured to an insulating support 154 and the movable contact 153 being secured to a flexible leaf spring 156. The spring 156 is again a plate-like member having an opening formed therethrough which receives the shaft 21, and an annular portion 157 of the spring 156 adjacent the opening therein is raised or offset toward the centrifugal mechanism. As will be explained hereinafter, the disc 147 and a collar 158 are adapted to engage the raised portion 157 in order to close the switch contacts 152 and 153.

FIG. 6 shows the running position of the centrifugal mechanism and FIG. 8 shows the at-rest position. When the centrifugal mechanism is in the at-rest position, the discs 147 engage the raised portion 157 of the leaf spring 156 and hold the switch contacts 152 and 153 closed. When the member 143 swings to the running position shown in FIG. 6 due to centrifugal force the discs 147 move out of engagement with the portion 157 of the leaf spring 156 and the switch 151 opens. Due to the circular shape of the disc 147, there is considerable space between the discs and the portion 157 when the mechanism is in the running position, and even if the shaft 21 were to shift to the right due to an excessive load as previously explained, the discs 147 would not close the switch 151. Such closure of the switch is accomplished however by the collar 158 which is rigidly secured to the shaft 21 between the centrifugal mechanism and the switch. The collar 158 includes a hub portion 159 which extends around and is rigidly secured to the shaft, and a switch actuating portion 161 which is integral with and extends radially outwardly from the hub portion 159. As shown in FIG. 7, the portion 161 is generally circular except for two recessed areas 162, the areas 162 being provided to permit the discs 147 to swing past the portion 161. The collar 158 is located on the shaft 21 relative to the switch 151 such that the actuating portion 161 is normally out of engagement with the leaf spring 156 but sufficiently close that the portion 161 is moved into engagement with the spring 156 when the shaft 21 shifts toward the right under overload conditions, as previously explained.

Thus, when a motor including the apparatus shown in FIGS. 6 to 8 is at standstill, the discs 147 hold the switch closed and the collar is spaced from the switch (FIG. 8). When the motor is running under normal load conditions, both the discs 147 and the collar 158 are out of engagement with the spring 156 and the switch is open (FIG. 6). When an overload occurs, the shaft 21 and the collar 158 move toward the right, and the collar engages and closes the switch. The centrifugal mechanism also shifts toward the right but not far enough for the disc 147 to engage and close the switch. When the switch is closed by the collar, the motor is reversed and starts to slow down. The shaft 21 returns to its normal position, but slowing down of the motor causes the mechanism to return to its at-rest position where the discs 147 engage and hold the switch contacts closed until the motor reaches running speed in the opposite direction.

The invention disclosed herein has numerous advantages. It accomplishes the same functions as the system disclosed in Pat. No. 3,078,407 without a control switch and without a special type of relay. Further, the system disclosed in the above patent requires a relatively expensive type of motor having two equal windings, whereas the present system employs a less expensive standard split phase type of winding. The present system is also advantageous as compared with a system such as shown in Hammes Pat. No. 2,701,855 since the present system may be reversed at any time during operation whereas the system in the Hammes patent may reverse only after first coming up to running speed and then slowing down to the reset speed of the centrifugal switch.

If desired, the limit switch units 77 and 78 could be arranged to close switch 141 at the same time that the limit switch 81 is opened by either of the nuts 77 or 78. This would be advantageous because, if the start switch 129 were held closed when the device being driven reached the end of its travel and one of the nuts 77 and 78 opened the limit switch 81, the motor would automatically reverse rather than stall. In the event a capacitor motor is used, as shown in the drawings, closing the switch 141 when the limit switch 81 opened would further be advantageous because excitation of the motor by the capacitor would cause a braking action, which would limit drift of the device.

I claim:

1. A reversible electric motor for driving a device subject to meeting an obstacle, said motor comprising power output means connected to the device, a running winding, a starting winding, first circuit means including connections for energizing said running winding, second circuit means including connections for energizing said starting winding, said second circuit means including a first switch operable when opened to deenergize said starting winding when said motor is operating at above a predetermined percentage of running speed, and a second switch operable in response to a predetermined amount of operation of said motor for reversing said connection to said starting winding, whereby said motor is reversible from rotation in one direction to rotation in the opposite direction on reclosing of said first switch, said power output means being axially movable in reaction to said device meeting an obstacle, and means connected to said power output means and responsive to said axial movement for closing said first switch when said device meets an obstacle.

2. A reversible electric motor for driving a device subject to being stopped by an obstacle, said motor comprising a power output shaft connected to drive the device, a running winding and a starting winding, first circuit means including connections for energizing said running winding, second circuit means including connections for energizing said starting winding, said second circuit means including a first switch operable when opened to deenergize said starting winding when said motor is operating at above a predetermined percentage of running speed, and a second switch operable in response to a predetermined amount of operation of said motor for reversing said connections to said starting winding, said shaft being axially movable in reaction to said device meeting an obstacle, and means connected to said shaft and responsive to such axial movement when said device meets an obstacle for reclosing said first switch, whereby said motor is reversible and the device moves away from the obstacle.

3. A reversible electric motor comprising power output means for driving a load, a running winding and a starting winding, first circuit means including connections for energizing said running winding, second means including connections for energizing said starting winding, said second circuit means including first switch means operable when opened to deenergize said starting winding when said motor is operating at above a predetermined percentage of running speed and second switch means for reversing said connections to said starting winding, time delay means connected to said second switch means and responsive to rotation of said power output means in either direction and operable to preset said second switch means for subsequent motor energization in the opposite direction, said time delay means effecting such preset immediately after each time the motor starts up and said power output means rotates a predetermined amount, said preset of said second switch means enabling instant reversal of said motor from rotation in either direction to rotation in the opposite direction after said power output means rotates said predetermined amount on closing of said first switch means, said power output means being axially movable in reaction to an excessive load on said motor, and means connecting said power output means with said first switch means for closing said first switch means in reaction to said axial movement when there is an excessive load on said motor.

4. Apparatus as in claim 3, and further including third switch means connected to energize said starting winding even though said first switch means is open, whereby said motor may be instantly reversed either by closing said first or said third switch means.

5. Apparatus as in claim 4, wherein said third switch means is connected in parallel with said first switch means.

6. Apparatus as in claim 3, wherein said second switch means comprises a double-pole double-throw switch, and said starting winding being connected for energization through said switch in one direction or the other depending upon the position of said switch.

7. Apparatus as in claim 6, wherein said time delay means comprises a cam connected to be turned by said power output means of said motor, said cam being constructed to actuate said second switch means from one of its positions to the other of its positions each time after said shaft has turned a predetermined amount.

8. A reversible electric motor comprising a shaft, a running winding and a starting winding, first circuit means including connections for energizing said running winding second circuit means including connections for energizing said starting winding, said second circuit means including first switch means operable when opened to deenergize said starting winding when said motor is operating at above a predetermined percentage of running speed and second switch means for reversing said connections to said starting winding, and time delay means connected to said second switch means and responsive to rotation of said shaft in either direction and operable to preset said second switch means for subsequent motor energization in the opposite direction, said time delay means effecting such preset immediately after each time the motor starts up and said shaft rotates a predetermined amount, said preset of said second switch means enabling instant reversal of said motor from rotation in either direction to rotation in the opposite direction after it rotates said predetermined amount on closing of said first switch means, said second switch means comprising a double-pole double-throw switch, and said starting winding being connected for energization through said switch in one direction or the other depending upon the position of said switch, said time delay means comprising a cam connected to be turned by said power output shaft of said motor, said cam being constructed to actuate said second switch means from one of its positions to the other of its positions each time after said shaft has turned a predetermined amount, said second switch means including an actuating arm and said second switch means being in one of its positions when said arm is depressed and in the other of its positions when said arm is released, said cam including an arcuate raised portion adapted to engage and depress said actuating arm, said cam being connected in friction fit relation with said shaft, and further including stop means positioned to be engaged by said raised portion of said cam upon turning movement of said cam and thus limiting said turning movement in both directions to less than 360°, the arc of said raised portion and the arc of said stop means being such that said shaft and said cam must turn through at least a predetermined angle in either direction before said second switch will shift from one of its positions to the other of its positions.

9. A reversible electric motor comprising a shaft, a running winding and a starting winding, first circuit means including connections for energizing said running winding, second circuit means including connections for energizing said starting winding, said second circuit means including first switch means operable when opened to deenergize said starting winding when said motor is operating at above a predetermined percentage of running speed and second switch means for reversing said connections to said starting winding, and time delay means connected to said second switch means and responsive to rotation of said shaft in either direction and operable to preset said second switch means for subsequent motor energization in the opposite direction, said time delay means effecting such preset immediately after each time the motor starts up and said shaft rotates a predetermined amount, said preset of said second switch means enabling instant reversal of said motor from rotation in either direction to rotataion in the opposite direction after it rotates said predetermined amount on closing of said first switch means, said first switch means comprising a switch and a centrifugal mechanism for actuating said switch at a predetermined motor speed, said centrifugal mechanism being connected to and rotatable with said shaft, said shaft being mounted for limited axial movement due to loads above a predetermined value, said switch being normally open at speeds above said predetermined motor speed but being closed by said mechanism when said shaft is moved axially by such a load.

10. Apparatus as in claim 9, wherein said centrifugal mechanism includes egg-shaped discs which engage and close said switch both when the motor is operating below said predetermined speed and also when said shaft is moved axially by such a load.

11. Apparatus as in claim 9, wherein said centrifugal mechanism includes discs which engage and close said switch when said motor is operating below said predetermined speed, and a collar which is secured to said shaft adjacent said switch and closes said switch when said shaft is moved axially by such a load.

12. Apparatus as in claim 11, wherein said collar has recesses formed therein adjacent said discs, and said discs swing past said collar in said recesses into and out of engagement with said switch.

13. Apparatus as in claim 3, and further including a pair of power input conductors adapted to be connected to said first and second circuit means, an electrical heater element serially connected in one of said input conductors, and an electric light and a thermally responsive normally open switch serially connected across said input conductors, said thermally responsive switch being located to be heated by said heater element, whereby said switch is closed and said light is energized, when motor current flows through said heater element, and said light remains energized, after said motor is deenergized until said thermally responsive switch has closed.

References Cited

UNITED STATES PATENTS

| 1,860,631 | 5/1932 | Stewart | 318—266 X |
| 2,542,432 | 2/1951 | Riverman | 318—266 |
| 3,045,164 | 7/1962 | Russell | 318—266 |
| 3,078,407 | 2/1963 | Schaefer | 318—266 X |
| 3,287,618 | 11/1966 | Stephens | 318—265 X |
| 3,383,577 | 5/1968 | Ellmore | 318—266 |

ORIS L. RADER, Primary Examiner

A. G. COLLINS, Assistant Examiner

U.S. Cl. X.R.

318—266